United States Patent
Lin et al.

(10) Patent No.: US 7,672,442 B2
(45) Date of Patent: Mar. 2, 2010

(54) SIGNAL RELAY DEVICE, METHOD THEREOF, AND SYSTEM USING THE SAME

(75) Inventors: Yider Lin, Tainan (TW); Yien-Chang Liao, Hsinchu (TW); Shang-Chih Tsai, Taichung (TW); Chunmin Chen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1847 days.

(21) Appl. No.: 10/702,592

(22) Filed: Nov. 7, 2003

(65) Prior Publication Data

US 2004/0233896 A1    Nov. 25, 2004

(30) Foreign Application Priority Data

Apr. 28, 2003    (TW) ............................... 92109881 A

(51) Int. Cl.
*H04M 7/00*    (2006.01)
(52) U.S. Cl. .................... 379/221.08; 370/352; 370/401
(58) Field of Classification Search ......... 370/352–356, 370/400, 401; 379/221.08, 221.09
See application file for complete search history.

(56) References Cited

U.S. PATENT DOCUMENTS

| | | | |
|---|---|---|---|
| 5,805,785 A | | 9/1998 | Dias et al. |
| 6,920,144 B2* | | 7/2005 | Niermann ................... 370/401 |
| 6,987,781 B1* | | 1/2006 | Miller et al. ................ 370/496 |
| 7,054,328 B2* | | 5/2006 | Prasad et al. ................ 370/410 |
| 7,515,607 B2* | | 4/2009 | Angermayr et al. ......... 370/466 |
| 2002/0141562 A1 | | 10/2002 | Matsuura |
| 2003/0162541 A1* | | 8/2003 | Schwarzbauer et al. ..... 455/432 |
| 2003/0227899 A1* | | 12/2003 | McCann ..................... 370/349 |
| 2005/0232407 A1* | | 10/2005 | Craig et al. ................. 379/229 |

* cited by examiner

*Primary Examiner*—Olisa Anwah
(74) *Attorney, Agent, or Firm*—Birch, Stewart, Kolasch & Birch, LLP

(57) ABSTRACT

A signal relay device, method thereof, and system using the same. The system utilizes SCTP with multiple transmission addresses to share communication layers above the transmission layer in signal gateway cluster, automatically switching to an available signal gateway for maintaining online status and increasing availability of signal transmission.

38 Claims, 3 Drawing Sheets

SIGNAL RELAY DEVICE, METHOD THEREOF, AND SYSTEM USING THE SAME

This Nonprovisional application claims priority under 35U.S.C. § 119 (a) on Patent Application No(s). 092109881 filed in TAIWAN on Apr. 28, 2003, the entire contents of which are hereby incorporated by reference.

BACKGROUND OF THE INVENTION

1. Field of the Invention

The present invention relates to a signal relay device and method thereof, and in particular to a system using the signal relay device, relaying an SS7 (Signaling System 7) signal from a PSTN (public switched telephone network) to an IP (Internet protocol) network.

2. Description of the Related Art

Conventional PSTNs, used in analog stations and fax transmission, and IP networks, used in digital data transmission, function under different networking protocols. For development of digital signal processing (DSP) and computer telephone integration (CTI) technologies, modern products and services extend new applications in computers and telephones like computer telephone application generators, unified message systems (UMS), and automatic call distribution, integrating them with Internet function to provide Internet telephone gateways.

Voice over Internet protocol (VoIP), based on international telecommunication union-telecommunication standardization sector (ITU-T) H.323, provides basic call services. The H.323 architecture, however, cannot equip current VoIP systems for future integration with PSTN. Signals for a PSTN call are passed via a trunk gateway and SS7 signals network. SS7-ISUP (Integrated Service Digital Network User Part) signaling takes charge of the call, passing between an originating switch and a terminal switch through signal transfer points of an SS7 network for general communication. In an Internet telecommunication architecture, an IP network works with a conventional telecommunication network through an SS7 network and signal gateway (SG), receiving signals from the SS7 network, which is then converted and transferred to a media gateway controller (MGC), capable of call control and routing, signaling processing, media gateway control, and call detail recording (CDR).

In a conventional PSTN, signaling is transferred through signal transfer points to a local exchange to be marked and then transmitted to a telephone receiver. In addition, signaling is transferred among signal transfer points according to routing tables internally established, wherein the signal transfer points pick an available route to determine a new transfer point when a subsequent transfer point is unavailable. A signal gateway is a bridge between an SS7 network and an IP network, transferring call control messages as ISUP signaling. The single channel between a signal gateway and a media gateway controller, however, cannot bridge an SS7 network and an IP network.

In U.S. patent application Pub. No. 2002/0027983, Suzuki et al disclose a gateway system having a redundant structure of media gateway controllers, relating to a gateway system utilizing a common channel signaling system to connect an existing telephone network to an IP network, enhancing reliability without system downtime even during failure. The gateway system comprises a media gateway and a controller group therefor, comprising a plurality of media gateway controllers assigned with a common point code. Any of the media gateway controllers can terminate an SS7 signal representative of a control signal of the common channel SS7 in the telephone network and carry out call and connection control to the IP network by controlling the media gateway through the IP network. Thus, a communication path is established between the telephone network and the media gateway. Drawbacks of the application include the combination of signal gateways and media gateway controllers being unusual and lacking flexibility for receiving signals and synchronization data traffic between media gateway controllers is heavier due to synchronization signals from other media gateway controllers

SUMMARY OF THE INVENTION

Accordingly, an object of the present invention is to provide a signal relay device and method thereof for bridging a PSTN and an IP network and enabling data synchronization.

Another object of the invention is to provide a signal relay system relaying SS7 signals from a PSTN to a media gateway controller, allowing online backup to reestablish connection when a primary connection is broken.

The present invention provides a signal relay system using the signal relay device and method thereof. The system comprises a signal relay device, comprising a master signal relay process module and at least one slave signal relay process module, and a media gateway controller for sending an online request.

The master signal relay process module comprises a first M3UA-LM (Message Transfer Protocol 3—User Adaptation Layer—Layer Management) module corresponding to the communication layer of M3UA and a first SCTP-LM (Stream Control Transmission Protocol—Layer Management) module corresponding to the transmission layer of SCTP. The slave signal relay process module comprises a second M3UA-LM module corresponding to the communication layer of M3UA and a second SCTP-LM module corresponding to the transmission layer of SCTP.

The master signal relay process module sends first synchronization data using the first SCTP-LM module when receiving an online request from the media gateway controller, returning an IP message to the media gateway controller, and the slave signal relay process module receives the first synchronization data using the second SCTP-LM module. The media gateway controller connects with the master signal relay process module when receiving the IP message and sends a service-received request.

The master signal relay process module sends second synchronization data using the first SCTP-LM module when communication data is transferred between the media gate controller and the signal relay device, synchronizing information between the first SCTP-LM module and the second SCTP-LM module. Next, the slave signal relay process module receives the second synchronization data using the second SCTP-LM module, thereby updating an SCTP database. Next, the first M3UA-LM module sends third synchronization data when the communication data, such as ASPUP, ASPDN, ASPAC and ASPIA messages, changes the service status of the media gateway controller and the slave signal relay process module receives the third synchronization data using the second M3UA-LM module, thereby updating a M3UA database. Finally, the slave signal relay process module reestablishes the connection when connection between the master signal relay process module and the media gateway controller is broken.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The present invention provides a signal relay device and method thereof and a signal relay system using the same.

The method of the present invention provides transmission for telecommunication signaling with complete backup architecture to cope with unexpected errors in software and hardware. Signal gateways utilize SCTP, with multiple transmission addresses, in a transmission layer, enabling communication protocol layers thereabove to be shared between signal gateways for increased reliability.

One reason to replace Transmission Control Protocol (TCP) with SCTP is that SS7 signals transmission is urgent and the retransmission mechanism of TCP creates unacceptable delays. The other is that TCP is easily susceptible to resource limitation, resulting in system crash.

SCTP, defined by Internet Engineering Task Force Signaling Transport (IETF SIGTRAN), is a connection-oriented transmission protocol, transmitting signal messages from a PSTN to an IP network and satisfying application requirements, and, similar to TCP, a reliable transmission protocol in packet switching networks. Compared to TCP, SCTP provides more functions of non-sequential transmission, Internet protocol version 6 (IPv6) and IPv4 addressing, multiple transmission addresses, and others.

MTP3 takes charge in establishing routes for signaling packets and traffic control M3UA, based on SCTP, transmits SS7 signals between signal gateways and media gateway controllers. In addition, layer management defined in M3UA (M3UA-LM herein) sets M3UA parameters, establishes an SCTP connection, and maintains online status of media gateway controllers. The invention provides a layer management for SCTP (SCTP-LM herein), similar to M3UA-LM, to establish an internal network in which signal relay devices connect with each other for data synchronization.

Figure 1:
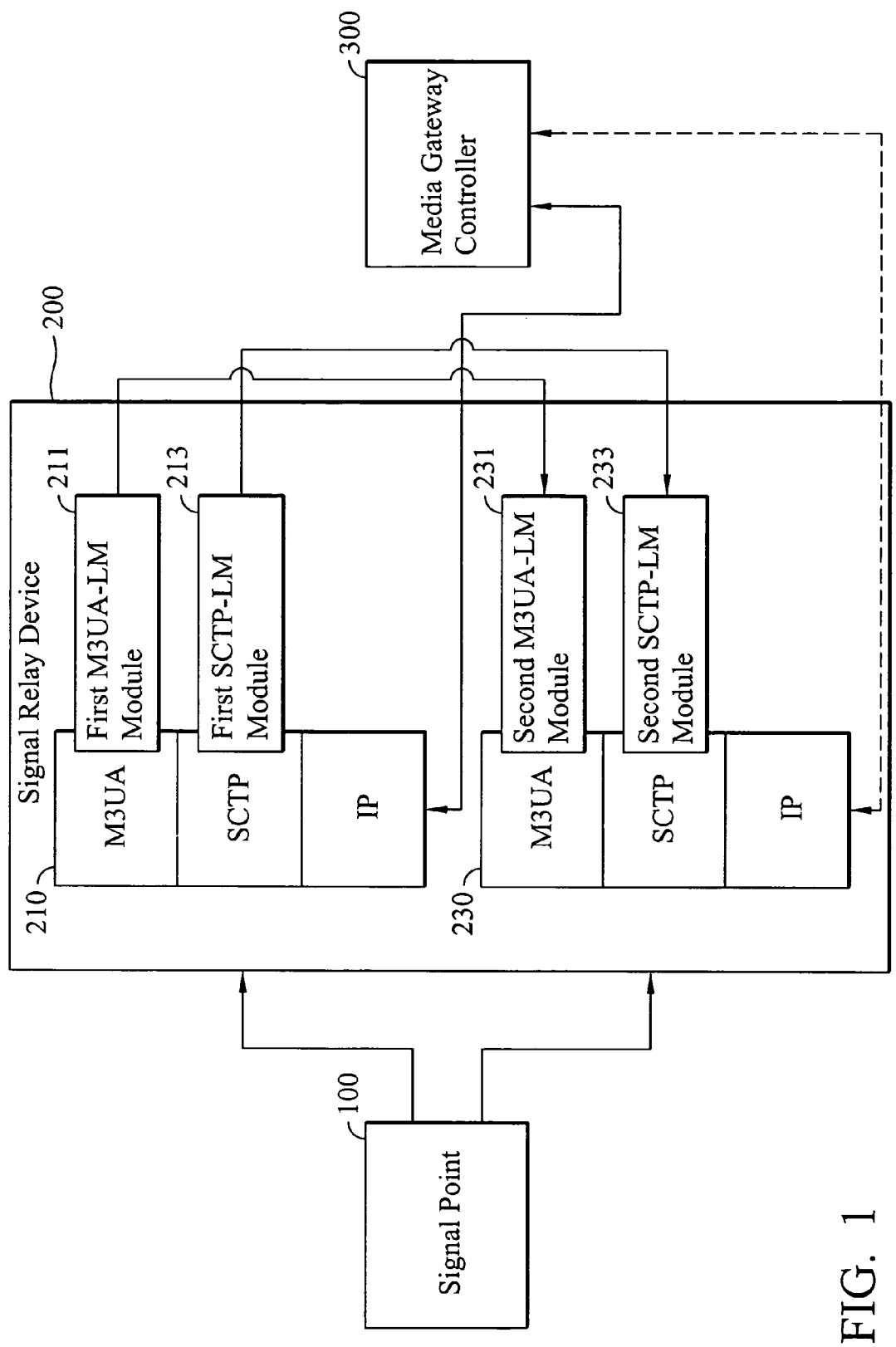
FIG. 1 is a schematic diagram showing the architecture of a signal relay system according to the present invention.

FIG. 1 is a schematic diagram showing the architecture of a signal relay system according to the present invention. The architecture comprises a signaling point 100, a signal relay device 200 comprising a master signal relay process module 210 and a slave signal relay process module 230, and a media gateway controller (MGC) 300. In addition, master signal relay process module 210 comprises a first M3UA-LM module 211 corresponding to the communication layer of M3UA and a first SCTP-LM module 213 corresponding to the transmission layer of SCTP. Slave signal relay process module 230 comprises a second M3UA-LM module 231 corresponding to the communication layer of M3UA and a second SCTP-LM module 233 corresponding to the transmission layer of SCTP.

First, MGC 300 sends an online request and master signal relay process module 210 sends first synchronization data using first SCTP-LM module 213 when receiving the online request and returns an IP message to MGC 300, in which the IP message includes IP addresses for master signal relay process module 210 and slave signal relay process module 230. Slave signal relay process module 230 then receives the first synchronization data using second SCTP-LM module 233.

Next, master signal relay process module 210 sends second synchronization data using first SCTP-LM module 213 when communication data is transferred between MGC 300 and signaling point 100, synchronizing information between first SCTP-LM module 213 and second SCTP-LM module 233.

Next, slave signal relay process module 230 receives the second synchronization data using second SCTP-LM module 233, thereby updating an SCTP database thereof. Master signal relay process module 210 then sends third synchronization data using first M3UA-LM module 211 when the communication data changes service status of MGC 300 and slave signal relay process module 230 receives the third synchronization data using second M3UA-LM module 231, thereby updating the service status of MGC 300 for M3UA thereof.

Synchronization data between the master signal relay process module and the slave signal relay process module uses SCTP connections, synchronized when connection is established or broken, or transmission control blocks (TCB), identification tags for SCTP, and others, synchronized when communication data is transferred through SCTP. Another is available service status of application server processes maintained by M3UA-LM and routing databases, synchronized when service status of media gateway controllers or routing data is changed.

Figure 2:
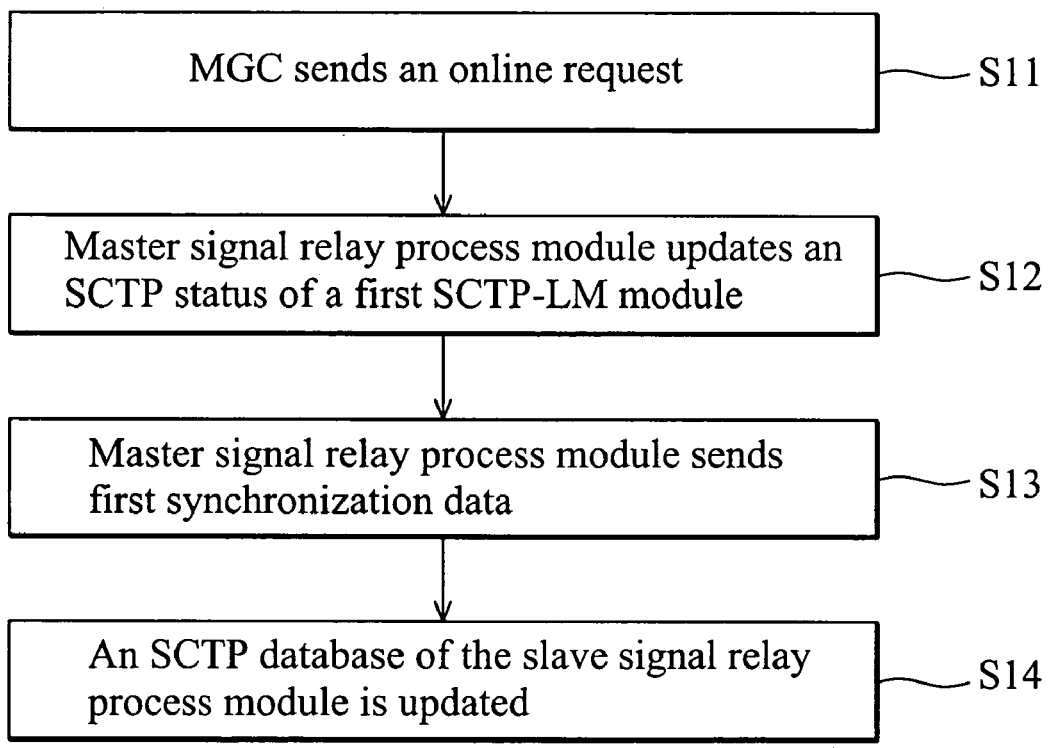
FIG. 2 is a flowchart showing detailed steps of establishing an SCTP connection between a media gateway controller and a signal relay device according to the present invention.

FIG. 2 is a flowchart showing detailed steps of establishing an SCTP connection between a media gateway controller and a signal relay device according to the present invention.

In Step S11, a media gateway controller sends an online request, comprising an IP address of the media gateway controller, through M3UA when connecting with a signal relay device, establishing an SCTP connection.

In Step S12, a master signal relay process module of the signal relay device receives the online request through SCTP, sends a connection prompt to upper M3UA, updates an SCTP status of a first SCTP-LM module thereof, and returns an IP message to the media gateway controller. Thus, a connection between the master signal relay process module and the media gateway controller is established.

In Step S13, the master signal relay process module sends first synchronization data using the first SCTP-LM module to a second SCTP-LM module of a slave signal relay process module of the signal relay device, since, because online data is changed, the SCTP connection is established, synchronizing online information.

In Step S14, the slave signal relay process module receives the first synchronization data using the second SCTP-LM module and updates an SCTP database thereof, completing the online backup with the media gateway controller.

The above describes the process for establishing an SCTP connection between a media gateway controller and a signal relay device. The service status of M3UA must be updated if the online status of SCTP is changed, described as follows.

Figure 3:
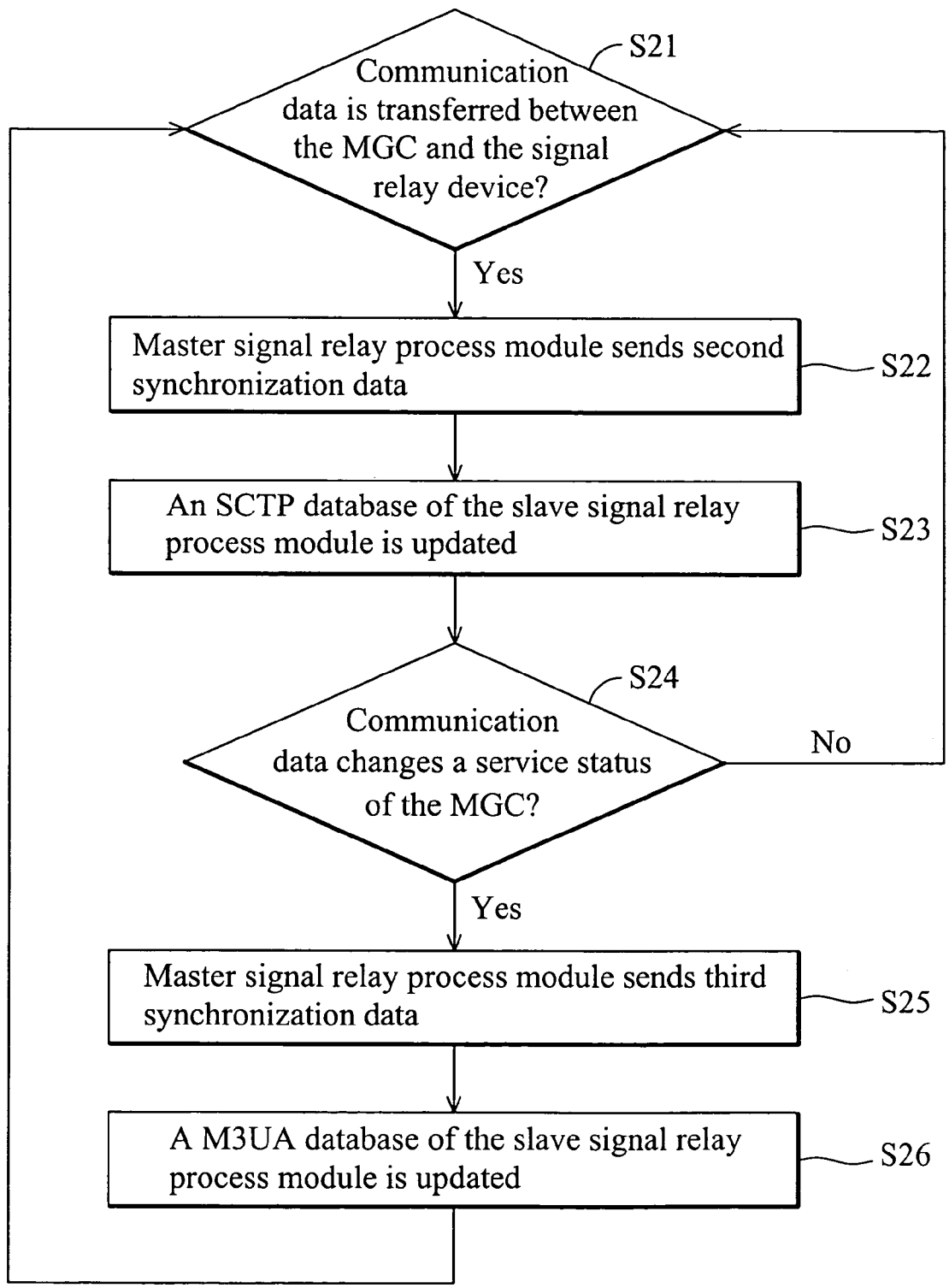
FIG. 3 is a flowchart showing detailed steps of data synchronization between a master signal relay process module and a slave signal relay process module when service status of the media gateway controller is changed according to the present invention.

FIG. 3 is a flowchart showing detailed steps of data synchronization between a master signal relay process module and a slave signal relay process module when service status of the media gateway controller is changed.

In Step S21, it is determined whether communication data is transferred between the media gateway controller and the signal relay device. If so, the process goes to step S22, and, if not, to step S24.

In Step S22, when communication data is transferred between the media gateway controller and the signal relay device, changing TCB information of SCTP, the master signal relay process module sends the second synchronization data using the first SCTP-LM module thereof to the second SCTP-LM module of the slave signal relay process module for synchronization of the TCB information of SCTP.

In Step S23, the slave signal relay process module receives the second synchronization data using the second SCTP-LM module thereof and thereby updates the SCTP database thereof, completing synchronization of the TCB information of SCTP with the master signal relay process module.

In Step S24, it is determined whether the communication data has changed the service status of the media gateway controller. If so, the process goes to step S25, and, if not, to step S21.

In Step S25, when the communication data changes the service status, the master signal relay process module sends third synchronization data using the first M3UA-LM module thereof to the second M3UA-LM module of the slave signal relay process module for synchronization of the service status of the media gateway controller.

In Step S26, the slave signal relay process module receives the third synchronization data using the second M3UA-LM module thereof and thereby updates a M3UA database thereof, completing synchronization of the service status of the media gateway controller with the master signal relay process module.

The media gateway controller switches the IP address and transfers the communication data from the master signal relay process module to the slave signal relay process module when connection between the master signal relay process module and the media gateway controller is broken, synchronizing SCTP online status, TCB information, and service status of Application Server Processes (ASP) of the slave signal relay process module with the master signal relay process module for continuing the data transmission.

The present invention's transport layer provides increased availability with quick diagnostic reaction, without processing or retention of additional information, such that media gateway controllers' corresponding standards are thoroughly supported.

When the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal relay device for bridging a public switched telephone network (PSTN) and an Internet protocol (IP) network, comprising:
   a master signal relay process module, comprising a first Message Transfer Protocol 3-User Adaptation Layer-Layer Management (M3UA-LM) module corresponding to a communication layer of M3UA and a first Stream Control Transmission Protocol-Layer Management (SCTP-LM) module corresponding to a transmission layer of SCTP, establishing a connection to the IP network; and
   at least one slave signal relay process module, coupled to the master signal relay process module, comprising a second M3UA-LM module corresponding to the communication layer of M3UA and a second SCTP-LM module corresponding to the transmission layer of SCTP, reestablishing the connection to the IP network when it is broken;
   wherein the master signal relay process module sends second synchronization data using the first SCTP-LM module when communication data is transferred between a media gate controller and a signal relay device, the slave signal relay process module receives the second synchronization data using the second SCTP-LM module, updating an SCTP database based on the second synchronization data, the first M3UA-LM module sends third synchronization data when the communication data changes service status of the media gateway controller, and the slave signal relay process module receives the third synchronization data using the second M3UA-LM module, updating a M3UA database based on the third synchronization data.

2. The device as claimed in claim 1, wherein when the communication data is transferred between the media gateway controller and the signal relay device, resulting in variation of transmission control block (TCB) information of the SCTP, the signal relay device sends the second synchronization data.

3. The device as claimed in claim 1, wherein the second synchronization data refers to transmission control blocks and identification tags of SCTP.

4. The device as claimed in claim 1, wherein the third synchronization data refers to the available service status and a routing database of the media gateway controller maintained by the second M3UA-LM module.

5. The device as claimed in claim 1, wherein the media gateway controller sends an online request when connecting to the signal relay device, the master signal relay process module then receives the online request through SCTP, updating the service status of SCTP of the first SCTP-LM module, the master signal relay process module sends first synchronization data, and the slave signal relay process module receives the first synchronization data using the second SCTP-LM module, updating the SCTP database thereof.

6. The device as claimed in claim 5, wherein the online request comprises an Internet protocol (IP) address of the media gateway controller.

7. The device as claimed in claim 5, wherein the media gateway controller sends the online request to the signal relay device through M3UA.

8. The device as claimed in claim 5, wherein the master signal relay process module receives the online request and then sends an IP message to the media gateway controller.

9. The device as claimed in claim 8, wherein the IP message comprises IP addresses of the master and slave signal relay process modules.

10. The device as claimed in claim 5, wherein the first synchronization data refers to online data of SCTP.

11. The device as claimed in claim 5, wherein the first synchronization data is sent when connection between the media gateway controller and the signal relay device is broken.

12. A method of signal relay from a public switched telephone network (PSTN) and an Internet protocol (IP) network, comprising steps of:
   sending of second synchronization data using the first Stream Control Transmission Protocol-Layer Management (SCTP-LM) module by a master signal relay process module when communication data is transferred between a media gateway controller and a signal relay device;

updating an SCTP database according to the second synchronization data;

sending of third synchronization data using a first Message Transfer Protocol 3-User Adaptation Layer-Layer Management (M3UA-LM) module by the master signal relay process module when the communication data changes the service status of the media gateway controller; and updating a M3UA database according to the third synchronization data.

13. The method as claimed in claim 12, wherein, when the communication data is transferred between the media gateway controller and the signal relay device, resulting in variation of transmission control block (TCB) information of SCTP, the signal relay device sends the second synchronization data.

14. The method as claimed in claim 12, wherein the slave signal relay process module receives the second synchronization data using a second SCTP-LM module.

15. The method as claimed in claim 12, wherein the slave signal relay process module receives the third synchronization data using the second M3UA-LM module.

16. The method as claimed in claim 12, wherein the second synchronization data refers to transmission control blocks and identification tags of SCTP.

17. The method as claimed in claim 12, wherein the third synchronization data refers to the available service status and a routing database of the media gateway controller maintained by the second M3UA-LM module.

18. The method as claimed in claim 12, further comprising, when the media gateway controller establishes connection to the signal relay device, steps of:

sending of an online request by the media gateway controller;

updating the service status of SCTP of the first SCTP-LM module of the master signal relay process module according to the online request;

sending of first synchronization data by the master signal relay process module; and updating the SCTP database of the slave signal relay process module according to the first synchronization data.

19. The method as claimed in claim 18, wherein the online request comprises an Internet protocol (IP) address of the media gateway controller.

20. The method as claimed in claim 18, wherein the media gateway controller sends the online request to the signal relay device through M3UA.

21. The method as claimed in claim 18, wherein, during status update, the master signal relay process module receives the online request and then sends an IP message to the media gateway controller.

22. The method as claimed in claim 21, wherein, during status update, the IP message comprises IP addresses of the master and slave signal relay process modules.

23. The method as claimed in claim 18, wherein, during status update, the master signal relay process module receives the request through SCTP.

24. The method as claimed in claim 18, wherein the slave signal relay process module receives the first synchronization data using the second SCTP-LM module.

25. The method as claimed in claim 18, wherein the first synchronization data refers to online data of SCTP.

26. A signal relay system, relaying SS7 signals from a public switched telephone network (PSTN) to an IP network, comprising:

a media gateway controller; and a signal gateway device, coupled to the media gateway controller, relaying the SS7 signals to the media gateway controller in the IP network, comprising a master signal relay process module and at least one slave signal relay process module, in which the master signal relay process module comprises a first Message Transfer Protocol 3-User Adaptation Layer Layer Management (M3UA-LM) module corresponding to a communication layer of M3UA and a first Stream Control Transmission Protocol-Layer Management (SCTP-LM) module corresponding to a transmission layer of SCTP and the slave signal relay process module comprises a second M3UA-LM module corresponding to the communication layer of M3UA and a second SCTP-LM module corresponding to the transmission layer of SCTP;

wherein the master signal relay process module sends second synchronization data using the first SCTP-LM module when communication data is transferred between the media gate controller and the signal relay device, the slave signal relay process module receives the second synchronization data using the second SCTP-LM module, updating an SCTP database thereof, the first M3UA-LM module sends third synchronization data when the communication data changes service status of the media gateway controller, and the slave signal relay process module receives the third synchronization data using the second M3UA-LM module, updating a M3UA database thereof.

27. The system as claimed in claim 26, wherein when communication data is transferred between the media gateway controller and the signal relay device resulting in variation of transmission control block (TCB) information of the SCTP, the signal relay device sends the second synchronization data.

28. The system as claimed in claim 26, wherein the second synchronization data refers to transmission control blocks and identification tags of SCTP.

29. The system as claimed in claim 26, wherein the third synchronization data refers to the available service status and routing databases of the media gateway controller maintained by the second M3UA-LM module.

30. The system as claimed in claim 26, wherein the media gateway controller sends an online request when connecting to the signal relay device, the master signal relay process module receives the online request through SCTP, updating the service status of the SCTP of the first SCTP-LM module, the master signal relay process module sends first synchronization data using the first SCTP-LM module, and the slave signal relay process module receives the first synchronization data using the second SCTP-LM module, updating the SCTP database thereof.

31. The system as claimed in claim 30, wherein the online request comprises an Internet protocol (IP) address of the media gateway controller.

32. The system as claimed in claim 30, wherein the master signal relay process module receives the online request and then sends an IP message to the media gateway controller.

33. The system as claimed in claim 32, wherein the IP messages comprises IP addresses of the master and slave signal relay process modules.

34. The system as claimed in claim 30, wherein the first synchronization data is sent when connection between the media gateway controller and the signal relay device is broken.

35. The device as claimed in claim 1, wherein the slave signal relay process module reestablishes the connection to the IP network when the connection between the master signal relay process module and the IP network is broken.

36. The device as claimed in claim 1, wherein the master signal relay process module and the slave signal relay process module are integrated in a single device.

37. The system as claimed in claim 26, wherein the slave signal relay process module reestablishes the connection to the IP network when the connection between the master signal relay process module and the IP network is broken.

38. The system as claimed in claim 26, wherein the master signal relay process module and the slave signal relay process module are integrated in a single device.

* * * * *